March 24, 1953 G. H. PROSS 2,632,518
GARDEN TRACTOR

Filed Oct. 6, 1947 3 Sheets-Sheet 1

INVENTOR
GEORGE H. PROSS
BY Cook and Schermerhorn
ATTORNEYS

March 24, 1953 G. H. PROSS 2,632,518
GARDEN TRACTOR
Filed Oct. 6, 1947 3 Sheets-Sheet 2
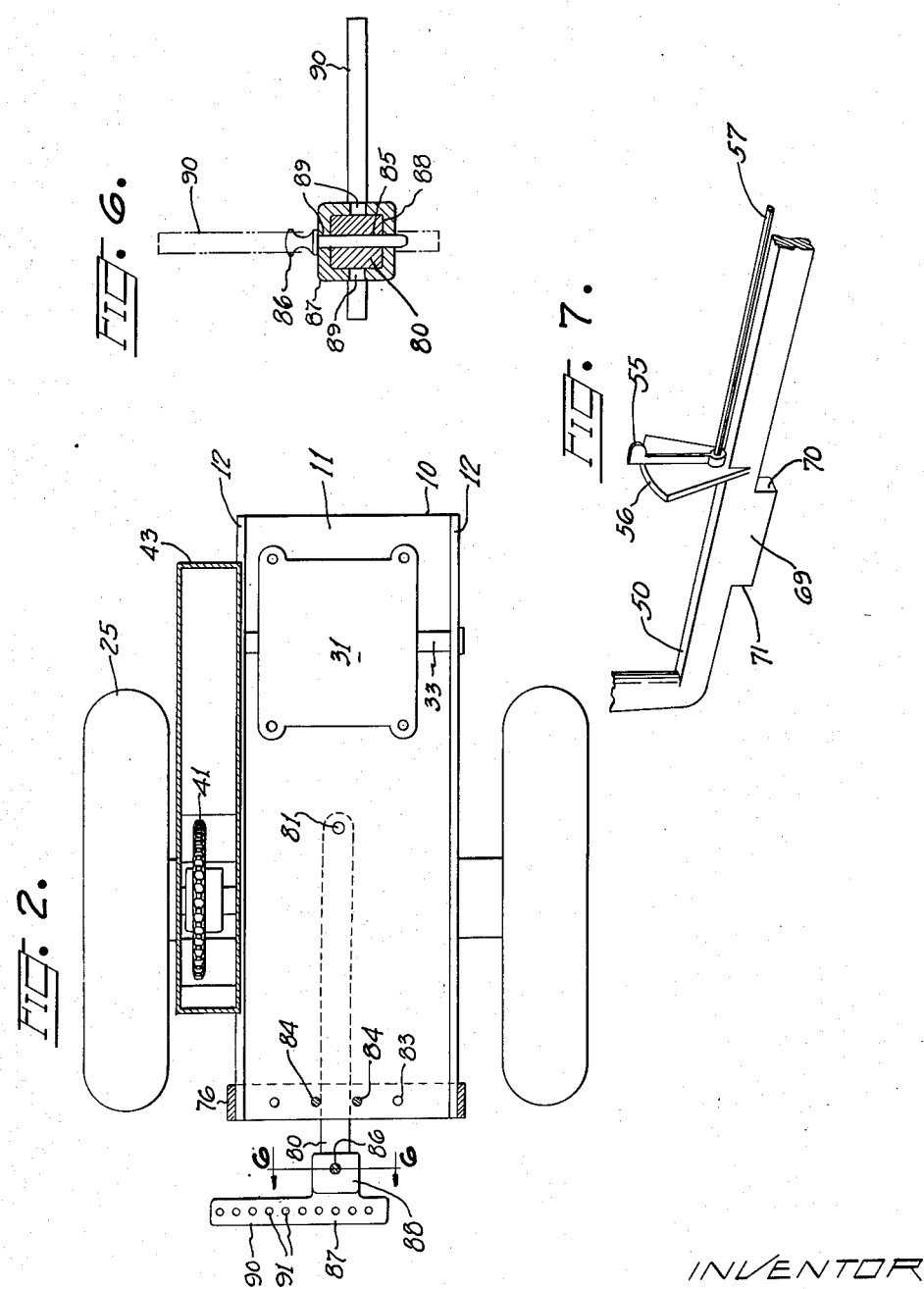
INVENTOR
GEORGE H. PROSS
BY Cook and Ackermeshorn
ATTORNEYS March 24, 1953 G. H. PROSS 2,632,518
GARDEN TRACTOR
Filed Oct. 6, 1947 3 Sheets-Sheet 3
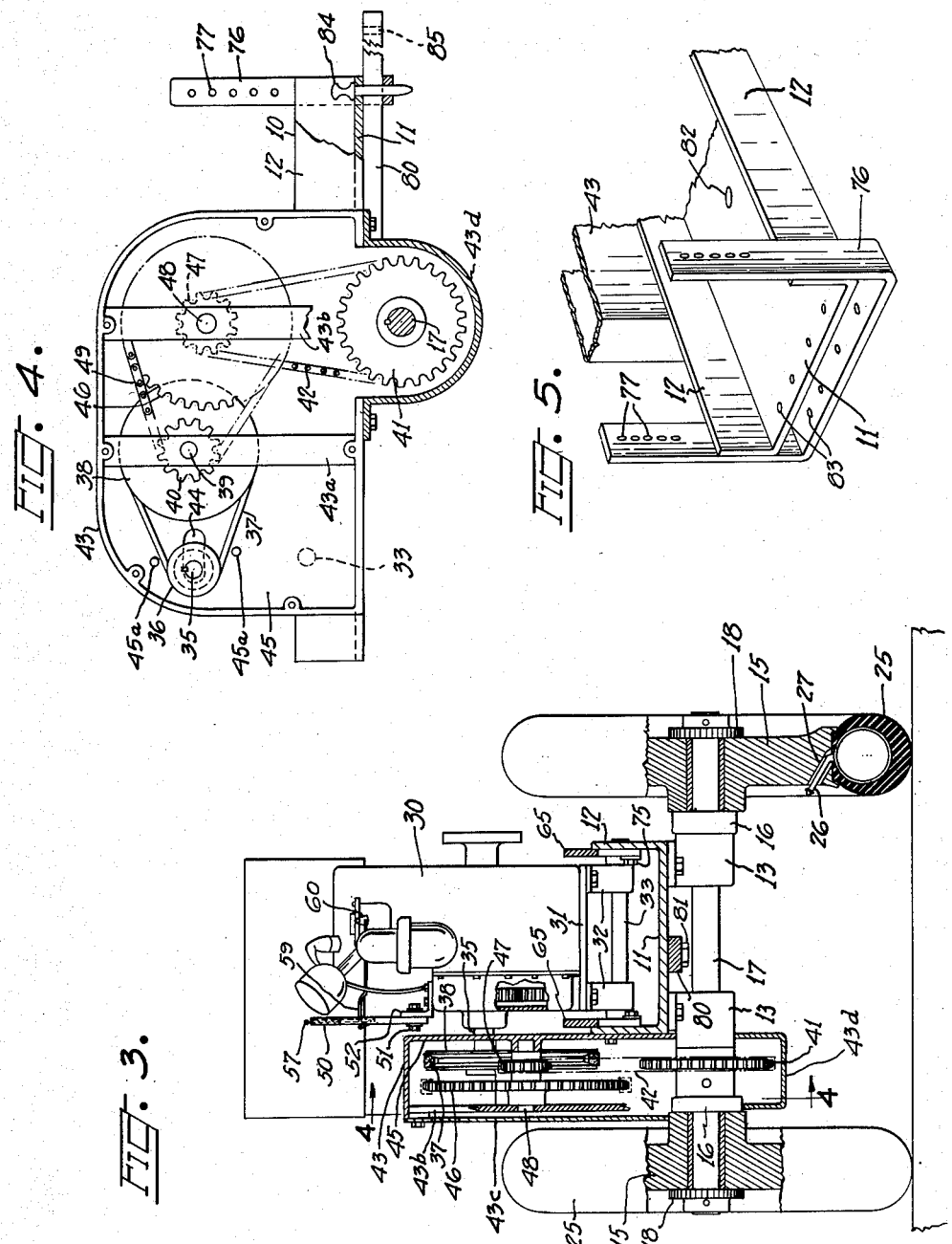
INVENTOR
GEORGE H. PROSS
BY Cook and Schermerhorn
ATTORNEYS Patented Mar. 24, 1953

2,632,518

UNITED STATES PATENT OFFICE 2,632,518

GARDEN TRACTOR

George H. Pross, Vancouver, Wash.

Application October 6, 1947, Serial No. 778,070

6 Claims. (Cl. 180—19)

This invention relates to improvements in garden tractors of the type having a small power plant mounted on two wheels and adapted to be steered and controlled by an operator walking behind the tractor.

In general, the objects of the invention are to provide a novel and improved construction for tractors of the type described which is economical to build and operate, which is rugged and durable, which is powerful and efficient in operation, and which is easy to control.

Other and more specific objects are to provide a construction having improved traction for pulling different implements in tilling and cultivating the soil, to provide a novel and improved mounting arrangement for the engine and other parts on the frame of the tractor and to provide improved control mechanism for controlling the power output of the engine.

With the above and other objects in view which will appear as the description proceeds, the invention further resides in the novel construction, combination and arrangement of parts substantially as hereinafter described, and more particularly defined by the appended claims, it being understood that such changes in the precise embodiment of the herein disclosed invention may be made as come within the scope of the appended claims.

The accompanying drawings illustrate a preferred embodiment constructed in accordance with the principles of the invention and constituting a practical application thereof.

In the drawings:

Figure 2 is a top plan view with the engine and certain parts removed and other parts shown in section;

Figure 3 is a cross sectional view taken approximately on the line 3—3 of Figure 1;

Figure 4 is a fragmentary sectional view taken on the line 4—4 of Figure 3;

Figure 5 is a fragmentary perspective view of the rear end of the frame;

Figure 6 is a sectional view of the drawbar hitch taken on the line 6—6 of Figure 2; and Figure 7 is a fragmentary perspective view of the clutch and throttle control levers.

Figure 1:
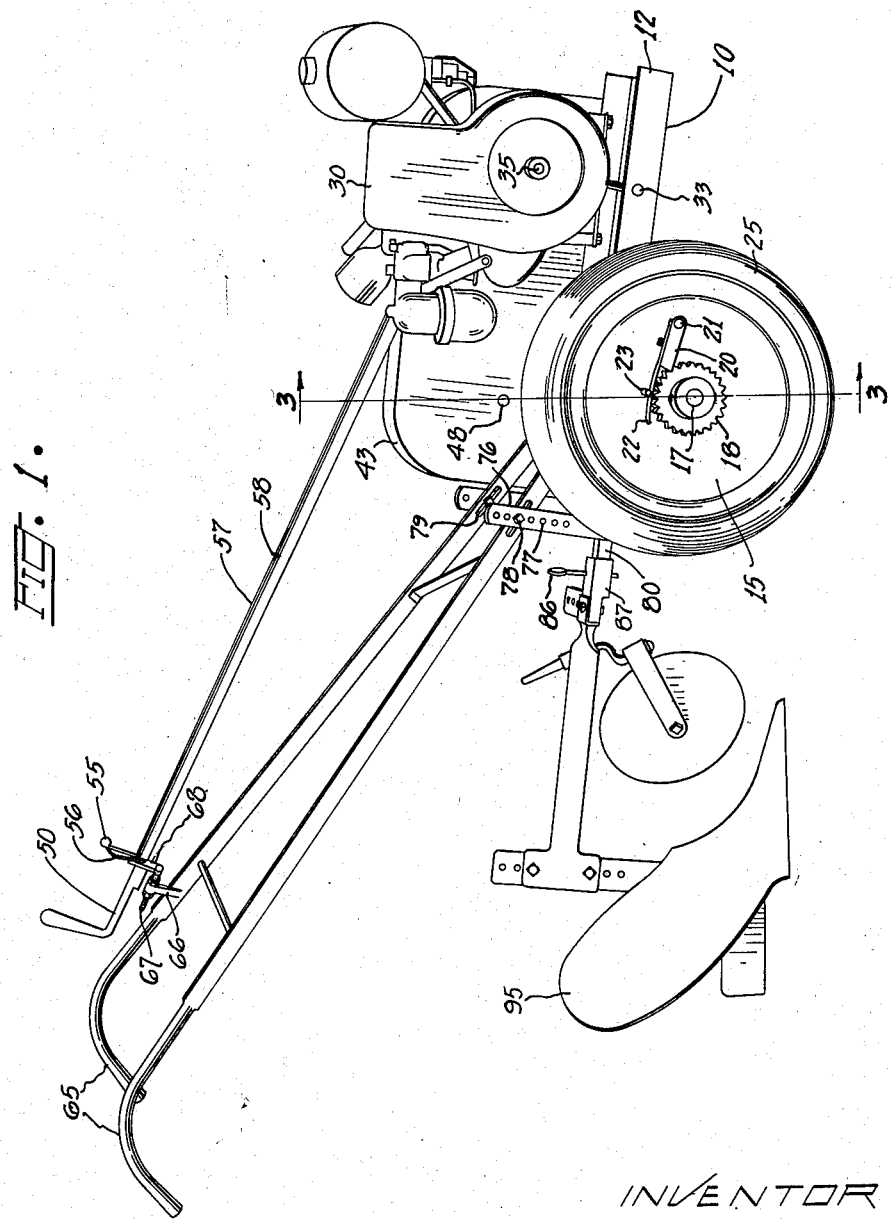
Figure 1 is a general perspective view of the tractor.

The various parts of the present tractor are mounted on and attached to a frame member 10, preferably of channel iron form having a horizontal bottom web 11 and vertical side flanges 12 extending upwardly therefrom. Mounted on the under side of the frame member 10 are bearings 13 for an axle 17 to drive a pair of wheels 15 which are in turn rotatively mounted on the ends of the axle as shown in Figure 3. Attached to the ends of the axle 17 are toothed wheels 18, each of which is adapted to engage a pawl 20 pivotally mounted at 21 on an outside surface of a wheel 15. The pawl 20 carries a spring leaf 22 bearing against an abutment 23 on the wheel to hold the pawl member resiliently in engagement with the toothed wheel 18, the pawl arrangement being such that forward driving torque on the axle 17 is transmitted from the toothed wheel 18 through the pawl to the wheel 15 to drive the vehicle, but allowing the wheel 15 at any time to rotate faster than the axle 17. Thus, in making a wide turn the tractor may be manually steered to cause the wheel on the outside of the turn to rotate faster than the axle which would then be driving only the wheel on the inside of the turn. To turn more sharply or to make a U-turn by pivoting on one wheel, the engine is disconnected from the axle by a clutch so that the axle ceases to rotate and then the tractor is wheeled around the turn by hand with the wheel on the inside of the turn remaining relatively stationary. When the engine is not operating, the tractor may be pushed manually with both wheels 15 free wheeling on the axle 17. A pair of collars 16 on the axle hold the wheels 15 in their proper positions against the toothed wheels 18.

The wheels 15 are preferably made to considerable thickness of cast iron or other heavy material to provide ballast weight for traction purposes. By having the weight concentrated in the wheels good traction is obtained without increasing the size and cost of the various fabricated parts of the vehicle which would otherwise have to support such weight. Thus, the tractor in general may be very simply and economically constructed since the strength requirements need only be sufficient to support the light weight engine whereas, if the necessary ballast weight were carried by the frame, then the frame, axle and wheel bearings would all have to be of heavier and more expensive construction to carry the total weight. The wheels 15 are preferably provided with rims for mounting pneumatic tires 25 having the usual inflatable inner tubes with valve stems 26. Suitable recesses 27 are provided in the wheel castings for access to the valve stems to inflate the tires.

The tractor is driven by an internal combustion engine 30 which is mounted on the frame 10 in a novel manner. The engine is bolted to a base plate 31 having a pair of bearings 32 secured to its under side by which it is mounted for rocking movement on a transverse bolt or shaft 33 supported at its ends in holes in the upstanding side flanges 12 of the frame. It will thus be seen that the center of gravity of the engine is above the point of pivotation and that the engine is substantially balanced on the shaft 33 in a position centrally of the arc of movement of the engine about said point of pivotation, but that it is in unstable equilibrium in the position of balance. The shaft 33 thereby provides a transverse pivotal support for the engine to permit it to rock back and forth. The manner of accomplishing the rocking movement and its purpose will be presently described. Figure 2 shows a plan view of the base plate 31 on the rock shaft 33 with the engine removed.

Referring now to Figure 4, showing the left side of the tractor, the numeral 35 designates the crankshaft, or power output shaft, of the engine 30. The tractor transmission comprises a pulley 36 on the shaft 35, a belt drive 37 to a larger pulley 38 on a short countershaft 39, sprocket wheels 40 and 41 on the respective shafts 39 and 17, and sprocket wheels 46 and 47 on a second countershaft 48. The several pulleys and sprockets are of different sizes, substantially as shown, to provide a suitable speed reduction between the engine and the axle when a pair of link chains 42 and 49 are placed on the sprockets. These transmission elements are preferably enclosed by a separate housing 43 having a side wall 45 provided with bearings for one end of the shafts 39 and 48, and having a pair of supports 43a and 43b with bearings for the other end of these shafts. Access to the transmission is obtained by removing the side cover 43c shown in Figure 3, and bottom cover 43d.

The side wall 45 has an arcuate slot 44 concentric with shaft 33 to permit oscillation of the engine crankshaft 35 in this slot about the pivotal support 33, it being understood that the engine 30 is disposed outside the housing 43 and closely adjacent the vertical wall 45 with the end of shaft 35 carrying pulley 36 being disposed within the housing. It is apparent, then, that the engine 30 may be rocked on its supporting shaft 33 to either tighten or slacken the belt drive 37 to function as a clutch for the driving transmission of the tractor. A pair of belt guides 45a are mounted on the wall 45 to prevent the belt from jumping off the pulley 36 when it is slackened. The engine is preferably mounted to balance on the shaft 33 in a mid position between its normal idling and driving positions so that when pushed or pulled over center in either direction its weight will tend to hold it in the desired position. This condition of balance, while desirable, is not necessary to the successful operation of the clutch however, since means will presently be described for positively holding the engine in either idling or driving position.

Operation of the clutch is effected by a long handle 50 pivotally connected to the engine as by a bolt 51 in a bracket 52 on the engine, shown in rear view in Figure 3. When the handle 50 is pulled rearwardly of the tractor the engine is rocked back to move the crankshaft 35 closer to the countershaft 39 and slacken the belt drive 37. The pulley 36 then rotates idly in the loose belt loop without rotating the shaft 39 and without transmitting tractive effort to the wheel shaft 17. When it is desired to start the tractor, the handle 50 is thrust forward slowly to place the crankshaft 35 at a greater distance from the countershaft 39 and thereby tighten the belt drive 37 gradually until the pulleys 36 begin to grip the belt and rotate the other elements of the transmission to perform the usual function of a clutch in starting the vehicle smoothly. The front of the tractor is to the left in Figure 4, and the rear is to the right. Means will presently be described for holding the handle 50 in its forward position to keep the belt 37 sufficiently tight to transmit the engine torque.

The speed of the engine is controlled by a throttle lever 55, rotatable on a quadrant plate 56 on the handle 50, as shown in Figures 1 and 7. The lever 55 constitutes an angular end portion on a long rod or shaft 57 secured to an intermediate portion of the handle lever 50 by a bearing element 58. The lower end of the throttle rod 57 is provided with an angular crank end adjacent the pivot 51 which is connected with a link 59 to the engine throttle lever 60, as shown in Figure 3. In view of the fact that the engine throttle lever 60 is a part of the engine, throttle rod 57 moves longitudinally as a unit with the handle lever 50, which is also attached to the engine, during longitudinal movement of handle lever 50 to engage or disengage the clutch. It will thereby be seen that the throttle rod 57, which functions by rotary movement, is freely operable in all positions of the handle lever 50. Thus the handle lever 50 performs both its function of control of the clutch, and also supports the throttle control.

The tractor and its soil tilling implements are steered and manipulated by a pair of handles 65. One of the handles 65 carries a post 66 which has an opening to receive a bolt 67 having an integral handle support and guide plate 68 for the clutch control handle 50. The plate 68 has an opening to receive the handle member 50 in longitudinal sliding movement to operate the clutch by rocking the engine in the manner described. The opening in the plate 68 is large enough to pass an enlarged portion 69 on the under side of handle 50 having two square cut ends 70 and 71, as shown in Figure 7, to function as stops. To disengage the clutch, the handle 50 is pulled rearwardly until quadrant plate 56 contacts the guide plate 68, as shown in Figure 1. After the enlarged portion 69 has passed through the plate 68 it drops down allowing the stop 70 to engage behind the plate 68 which serves as an abutment to hold the lever in its rearmost position.

To engage the clutch, the lever 50 is lifted slightly and pushed forward to pass the enlarged portion 69 through the plate 68, whereupon it again drops down, allowing the stop 71 to engage the front side of plate 68 to hold the clutch in driving position. The longitudinal position of the plate 68 is adjusted by means of nuts on the bolt 67, which nuts may be tightened in different positions on opposite sides of the post 66. When adjustment is required, as when the belts 37 become worn or stretched, when new belts are installed, or when the handles are raised or lowered on the tractor, the bolt 67 may be readily moved back or forward so that the clutch will be completely disengaged in the rearward position of the handle 50 and completely engaged with the proper belt tension for driving the tractor in the forward position of the handle.

The two shafts of the handle 65 are pivotally mounted on bolts 75 in the side flanges 12 of the frame member, as shown in Figure 3, so that the handles may be raised or lowered to a convenient position. Attached to the rear end of the frame in the manner shown in Figure 5 is a U-shaped bar of metal 76, preferably welded or bolted to the side flanges 12. The upstanding ends of this bar each have a series of holes 77 to receive a bolt 78 passing through an elongated slot 79 in the handle shaft. The handles 65 are thereby adjustably but rigidly mounted on the frame of the tractor to maintain a fixed position in relation to the movable clutch lever handle 50. When the handles 65 are raised or lowered, the bolt 67 on the clutch handle guide and abutment plate 68 may be adjusted in its supporting post 66 in the manner described.

The lower horizontal portion of the bar 76 is spaced below the horizontal web 11 of the channel frame 10 in parallel relation as shown in Figure 5 to provide a support and guide for the drawbar 80. The drawbar 80 is pivotally mounted at its forward end by a bolt 81 in a hole 82 in the bottom web 11 of the frame preferably forward of the axle as shown in Figure 2. A series of aligned holes 83 are provided in this web and in the bar 76 to receive pins 84 on either side of the drawbar to hold it in a desired angular position for draft purposes. By removing the pins 84, or by placing them in the end holes, the drawbar may be allowed to swing on its pivot 81.

The rear end of the drawbar 80 extends out some distance behind the frame of the tractor and is provided with a vertical hole 85 to receive a pin 86 for attaching a drawbar hitch bracket 87. The drawbar 80, or at least the rear end thereof, is preferably square in cross section, and the hitch bracket 87 is provided with a square socket 88 which may be placed on the drawbar in different positions as shown in Figure 6, circular openings 89 being provided in all four sides of the socket to receive the vertical pin 86. The bracket 87 has an elongated transverse hitch bar 90 with a series of holes 91 for connecting in different positions the various implements to be used with the tractor. Thus the bracket element 87 may be mounted on the drawbar 80 with the hitch bar 90 extending horizontally either to the right or to the left, or extending vertically either up or down. When the hitch bar 90 is mounted in a horizontal position, its length in addition to the lateral throw of the drawbar 80 provides for a considerable extreme offset in the attachment of different implements behind the tractor. When the hitch bar 90 is mounted in a vertical position, this bar itself provides for convenient vertical adjustment of the draft point, while the drawbar 80 may be swung to one side or the other to provide lateral horizontal adjustment. This availability of adjustment is of advantage in changing quickly to different implements for different kinds of work.

Figure 1 shows a plow 95 hitched to the tractor drawbar for plowing. It is to be understood, of course, that this is merely illustrative of one of many different implements which may be used with the present tractor and hitched to the drawbar bracket 87 in the various different ways described hereinabove. The present tractor is also particularly useful for harrowing and cultivating, for distributing fertilizer or seeding, and for various other operations in which a tractor may be used.

The present construction and arrangement of parts enables a small tractor with ample power and good traction to be constructed inexpensively and operated economically. By providing a ballast weight in the wheels, the frame and bearings and other structural parts are not required to withstand nearly as great stresses as would be the case if the same weight were carried on the axle by the frame. The present clutch arrangement is also extremely simple and inexpensive to manufacture and easy to operate and adjust. The only wearing parts in the clutch comprise the belt drive, which does not constitute a large item of expense, and which may be readily replaced without requiring the services of a skilled mechanic. Thus the operation is simplified and the problem of maintenance is minimized so that the mechanism may be successfully operated by relatively inexperienced and unskilled workers who do not have sufficient knowledge of machinery and engines to handle and care for conventional motorized equipment.

Having now described my invention and in what manner the same may be used, what I claim as new and desire to protect by Letters Patent is:

1. In a garden tractor and the like, a frame, a pivotal engine support on said frame, an engine mounted on said support with the center of gravity of the engine unstably balanced above the pivotal axis of said support for movement by gravity in one direction or the other to over-center positions on opposite sides of the pivotal axis of said support, where the motor is maintained by its weight in either position upon opposite sides of its pivotal axis, a slack belt drive connection with said engine, one of said over-center positions being a tight belt position to engage said drive connection and the other over-center position being a slack belt position to disengage said drive connection, and a handle for shifting said engine between said two positions.

2. In a garden tractor and the like, a tractor frame, a pivotal engine support on said frame, a throttle regulated engine mounted for rocking movement on said support, a slack belt drive connection with said engine, a handle having belt control movement for rocking said engine between tight belt and slack belt positions on said pivotal support to engage and disengage said drive connection, and a throttle lever for the engine mounted on and movable with said handle in said belt control movement without disturbing the engine throttle, said throttle lever having a throttle adjusting movement independent of said belt control movement.

3. In a garden tractor and the like, a tractor frame, a pivotal engine support on said frame, a throttle regulated engine mounted on said support above the pivotal axis thereof for rocking movement, a slack belt drive connection with said engine, said engine having a tight belt over-center position on one side of said pivotal axis to engage said drive connection and a slack belt over-center position on the other side of said pivotal axis to disengage said drive connection, a handle having longitudinal movement for shifting said engine selectively to said two positions on said pivotal mounting, and a throttle lever for the engine mounted on and movable with said handle in said longitudinal movements without disturbing the engine throttle, said throttle lever having rotative movement independent of said longitudinal movement for adjusting the engine throttle.

4. In a garden tractor and the like having a slack belt drive connection, a throttle regulated engine mounted on a pivotal support for rocking movement to tighten and slacken said belt, a control handle having longitudinal movement for rocking said engine to tighten and slacken said belt, and a throttle lever for said engine mounted on and movable with said control handle in said longitudinal movement, said throttle lever having rotative movement about an axis extending in the direction of said longitudinal movement to adjust the engine throttle.

5. In a garden tractor and the like having a throttle regulated engine with an engageable and disengageable drive connection, an elongated handle member having longitudinal movement for controlling said drive connection, and a throttle lever for the engine mounted on and movable with said handle member in said longitudinal movement without disturbing the throttle, said throttle lever having rotative movement independent of said longitudinal movement to adjust the throttle of the engine.

6. In a garden tractor and the like having a throttle regulated engine with an engageable and disengageable drive connection, a steering handle for the tractor adjustable to different positions relative to the tractor, a control handle connected with the engine and having a portion adjustably mounted on said steering handle to accommodate adjustment of the steering handle, said control handle having a control movement to engage and disengage said drive connection, and a throttle lever for the engine mounted on and movable with said control handle in said control movement without disturbing the engine throttle, said throttle lever having a separate throttle adjusting movement independent of said control movement.

GEORGE H. PROSS.

REFERENCES CITED

The following references are of record in the file of this patent:

UNITED STATES PATENTS

| Number | Name | Date |
|---|---|---|
| 1,124,214 | Davis | Jan. 5, 1915 |
| 1,290,475 | Allen | Jan. 7, 1919 |
| 1,316,359 | Decker | Sept. 16, 1919 |
| 1,412,834 | Bleoo | Apr. 18, 1922 |
| 1,482,013 | Jarvis et al. | Jan. 29, 1924 |
| 1,817,873 | Bready | Aug. 4, 1931 |
| 1,966,972 | Seeley | July 17, 1934 |
| 2,074,135 | Warner | Mar. 16, 1937 |
| 2,102,560 | Kimmich | Dec. 14, 1937 |
| 2,256,531 | Squires | Sept. 23, 1941 |
| 2,256,583 | Squires | Sept. 23, 1941 |
| 2,260,344 | Shaw | Oct. 28, 1941 |
| 2,307,096 | Zink et al. | Jan. 5, 1943 |
| 2,394,744 | Boumphrey | Feb. 12, 1946 |
| 2,401,796 | Raitch | June 11, 1946 |